US011355921B2

(12) United States Patent
Kim

(10) Patent No.: US 11,355,921 B2
(45) Date of Patent: Jun. 7, 2022

(54) DETECTING SYSTEM FOR CONTROL CIRCUIT OF LOAD

(71) Applicant: SAMSUNG SDI CO., LTD., Yongin-si (KR)

(72) Inventor: Tae Jin Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 17/108,128

(22) Filed: Dec. 1, 2020

(65) Prior Publication Data

US 2021/0194239 A1 Jun. 24, 2021

(30) Foreign Application Priority Data

Dec. 20, 2019 (KR) .................. 10-2019-0172340

(51) Int. Cl.
*H02H 5/04* (2006.01)
*H02H 1/00* (2006.01)

(52) U.S. Cl.
CPC .......... *H02H 5/047* (2013.01); *H02H 1/0007* (2013.01)

(58) Field of Classification Search
CPC .......... H02H 5/04–048; H02H 1/0007; H02H 3/085; H03K 2017/0806
See application file for complete search history.

(56) References Cited

U.S. PATENT DOCUMENTS

| 7,391,185 | B2 | 6/2008 | Tsubaki et al. |
| 7,550,950 | B2 | 6/2009 | Tsubaki et al. |
| 7,898,216 | B2 | 3/2011 | Seki |
| 2007/0164709 | A1 | 7/2007 | Tsubaki et al. |
| 2007/0216351 | A1 | 9/2007 | Seki |
| 2008/0246441 | A1 | 10/2008 | Tsubaki et al. |

(Continued)

FOREIGN PATENT DOCUMENTS

| JP | 3352820 B2 | 9/2002 |
| JP | 5025160 B | 9/2012 |

(Continued)

OTHER PUBLICATIONS

Translation for KR10-1093986 B1. Mar. 10, 2006. Accessed via Espacenet :<https://worldwide.espacenet.com/patent/search/family/037129051/publication/KR101093986B1?q=pn%3DKR101093986B1>. (Year: 2006).*

(Continued)

*Primary Examiner* — Jared Fureman
*Assistant Examiner* — Christopher J Clark
(74) *Attorney, Agent, or Firm* — Lee IP Law, PC

(57) ABSTRACT

A detecting system for a load control circuit includes: a main fuse connected on a main current path between a power supply and a load that receives power supplied from the power supply; a switching element connected on the main current path between the main fuse and the load; a thermal fuse attached to a surface of the switching element and configured to open when a temperature of the switching element exceeds a preset temperature; a controller configured to control the switching element to be turned on/off, detect an open state of the thermal fuse, and generate a fault signal; and a system controller configured to interrupt the power supplied from the power supply when the fault signal is received from the controller.

9 Claims, 2 Drawing Sheets

(56) References Cited

U.S. PATENT DOCUMENTS

2011/0317324 A1* 12/2011 Clevenger ............... H02H 7/20
                          361/104
2015/0130476 A1* 5/2015 Takahashi ............. H02M 3/158
                          324/537

FOREIGN PATENT DOCUMENTS

| KR | 10-1093986 B1 | 3/2006 |
| KR | 100862534 B1 | 10/2008 |
| KR | 10-0898285 B | 5/2009 |
| KR | 10-2011-0107529 A | 10/2011 |
| KR | 20-2016-0001084 U | 4/2016 |
| KR | 10-2016-0134601 A | 11/2016 |
| KR | 10-2017-0114576 A | 10/2017 |

OTHER PUBLICATIONS

Korean Office action dated Feb. 15, 2021.
Korean Notice of Allowance dated Nov. 25, 2021.

* cited by examiner

DETECTING SYSTEM FOR CONTROL CIRCUIT OF LOAD

CROSS-REFERENCE TO RELATED APPLICATION

Korean Patent Application No. 10-2019-0172340, filed on Dec. 20, 2019, in the Korean Intellectual Property Office, and entitled: "Detecting System for Control Circuit of Load," is incorporated by reference herein in its entirety.

BACKGROUND

1. Field

Embodiments relate to a detecting system for a control circuit of a load.

2. Description of the Related Art

In general, a circuit for controlling a load, for example, a fan, etc., may be protected by a fuse positioned at an input terminal. There may be a probability of burn damage or ignition of the system if a fault occurs to an internal system involving a current that is not greater than a rated current of the fuse, and the fault is not detected.

The above information disclosed in this Background section is only for enhancement of understanding of the background of the described technology and therefore it may contain information that does not form the prior art that is already known in this country to a person of ordinary skill in the art.

SUMMARY

Embodiments are directed to a detecting system for a load control circuit, the detecting system including: a main fuse connected on a main current path between a power supply and a load that receives power supplied from the power supply; a switching element connected on the main current path between the main fuse and the load; a thermal fuse attached to a surface of the switching element and configured to open when a temperature of the switching element exceeds a preset temperature; a controller configured to control the switching element to be turned on/off, detect an open state of the thermal fuse, and generate a fault signal; and a system controller configured to interrupt the power supplied from the power supply when the fault signal is received from the controller.

The thermal fuse may be configured to open when an amount of current flowing in the switching element exceeds a predetermined current.

The predetermined current may be less than a rated current of the main fuse.

The switching element may be a field effect transistor (FET) having a source connected to the main fuse, a drain connected to the load, and a gate connected to the thermal fuse.

The thermal fuse may be configured to open in response to a short circuit between the source and the gate.

The switching element may be a relay having a switch connected between the main fuse and the load, and a coil connected to the thermal fuse.

The thermal fuse may be attached to the surface of the switching element by a heat transfer adhesive material.

The thermal fuse may include a body that is in contact with the surface of the switching element, a first lead connected to the switching element, and a second lead connected to the controller.

The system controller may be configured to transmit a signal, indicative of occurrence of a faulty condition, to an upper system when the fault signal is received from the controller.

BRIEF DESCRIPTION OF DRAWINGS

Features will become apparent to those of skill in the art by describing in detail example embodiments with reference to the attached drawings in which.

DETAILED DESCRIPTION

Figure 1:
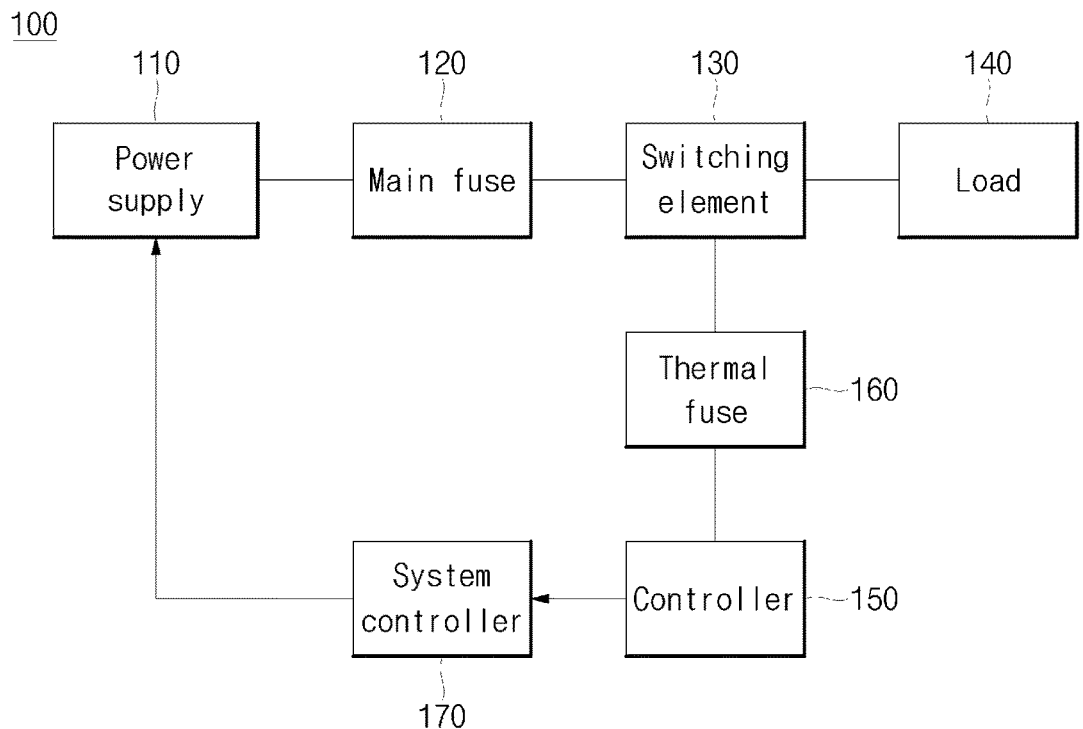
FIG. 1 is a block diagram showing a detecting system for a control circuit of a load, according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

In addition, the controller and/or any other relevant devices or components according to embodiments described herein may be implemented by utilizing any suitable hardware, firmware (e.g., an application-specific integrated circuit), software, or a suitable combination of software, firmware, and hardware. For example, the various components of the controller may be formed on one integrated circuit (IC) chip or on separate IC chips. Further, the various components of the controller may be implemented on a flexible printed circuit film, a tape carrier package (TCP), a printed circuit board (PCB), or formed on the same substrate. Further, the various components of the controller may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, the functionality of various computing devices may be combined or integrated into a single computing device, or the functionality of a particular computing device may be distributed across one or more other computing devices without departing from the scope of the embodiments.

Figure 2:
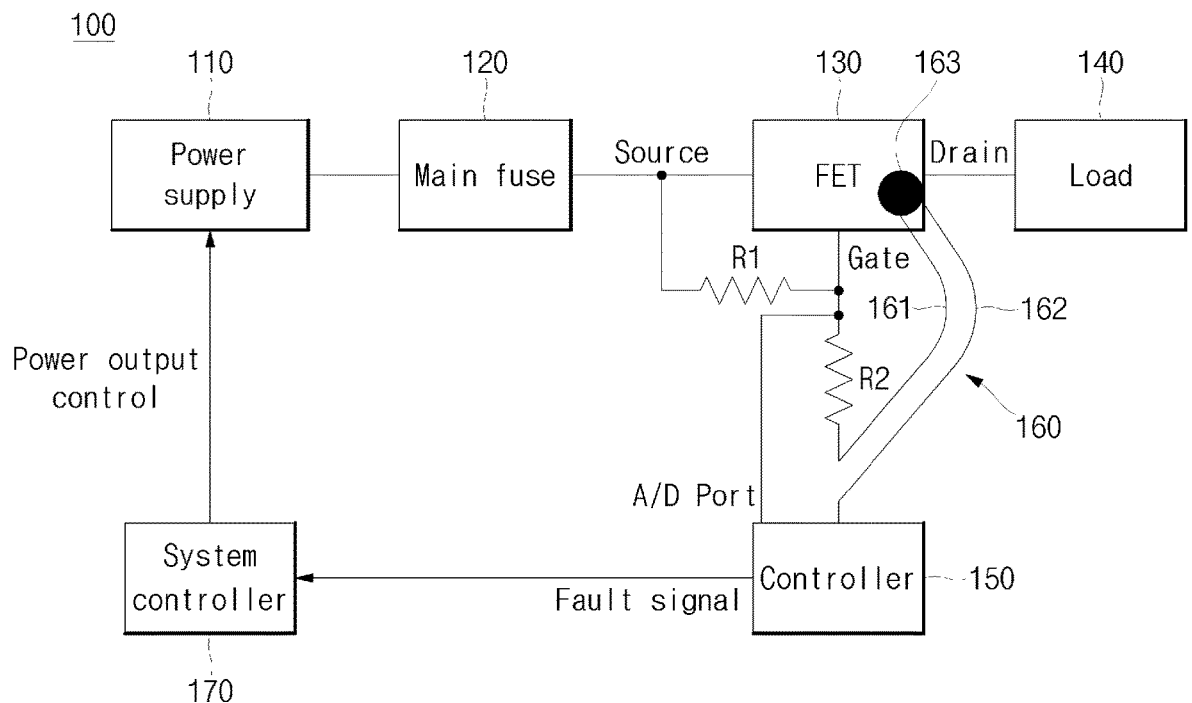
FIG. 2 is a block diagram showing a detecting system for a control circuit of a load in a case where a switching element is an FET.
Figure 3:
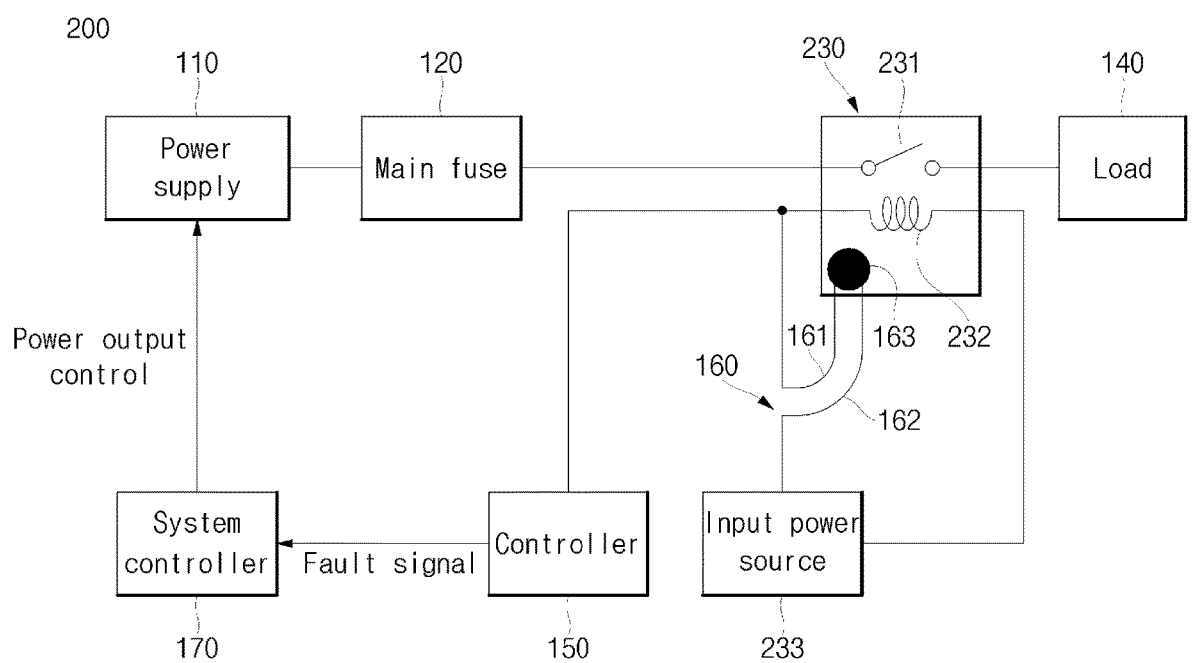
FIG. 3 is a block diagram showing a detecting system for a control circuit of a load in a case where a switching element is a relay.

FIG. 1 is a block diagram showing a detecting system for a control circuit of a load, according to an example embodiment. FIG. 2 is a block diagram showing a detecting system for a control circuit of a load in a case where a switching element is an FET. FIG. 3 is a block diagram showing a detecting system for a control circuit of a load in a case where a switching element is a relay.

Referring to FIG. 1, a load control circuit detecting system 100 according to an example embodiment may include a main fuse 120, a switching element 130, a controller 150, a thermal fuse 160, and a system controller 170. The load control circuit detecting system 100 may be coupled to a power supply 110 and a load 140.

The power supply 110 may be connected to the main fuse 120 and the switching element 130 to supply the controller 150 and the load 140 with power. In addition, the power supplied from the power supply 110 may be determined according to the specification of the load 140. The power supply 110 may supply the load 140 and the controller 150 with power of, for example, 12 V or 24 V.

In the present example embodiment, the main fuse 120 is positioned on a main current path between the power supply 110 and the load 140. When an abnormal current, such as a short circuit, flows along the main current path, the main fuse 120 is cut off, for example, opened, to protect the load control circuit detecting system 100. In an example embodiment, the abnormal current means a current that is larger than a predetermined rated current of the main fuse 120. In an example embodiment, when a current that is larger than the rated current flows along the main current path, the main fuse 120 is cut off to protect the load control circuit detecting system 100. The main fuse 120 may be positioned adjacent to the power supply 110 on the main current path. The main fuse 120 may be positioned between the power supply 110 and the switching element 130.

The switching element 130 may be connected between the power supply 110 and the load 140. For example, the switching element 130 may be connected between the main fuse 120 and the load 140. The switching element 130 may supply the load 140 with the power supplied from the power supply 110 to operate the load 140. In an example embodiment, the switching element 130 may include a field effect transistor (FET) as a high-speed operating switch or a relay as a low-speed operating switch.

A case where the switching element 130 is a FET will now be described with reference to FIG. 2.

Referring to FIG. 2, the FET as the switching element 130 may be positioned on the main current path to be used in controlling the operation of the load 140. The FET 130 may include a gate, a source, and a drain. The source may be connected to the main fuse 120, the drain may be connected to the load 140, and the gate may be connected to the controller 150. Thus, the controller 150 may control the FET 130 to be ON/OFF to operate the load 140 or to stop operating the load 140. As an example, when the FET 130 is turned ON, the load 140 operates, and when the FET 130 is turned OFF, the load 140 stops operating. In addition, a resistor R1 may be connected between the gate and the source.

The load 140 may operate by receiving the power from the power supply 110 and may be connected to the FET 130. In an example embodiment, the load 140 may be, for example, a fan driven by a motor, etc. The load 140 may be connected to the drain of the FET 130. When the FET 130 is ON, the load 140 may receive the power from the power supply 110 to then operate.

The thermal fuse 160 may be connected between the FET 130 and the controller 150.

The thermal fuse 160 may include a first lead 161, a second lead 162, and a body 163. The first lead 161 and the second lead 162 may be configured to protrude from the body 163, e.g., to opposite sides of the body 163. The first lead 161 may be connected to the gate of the FET 130, and the second lead 162 may be connected to the controller 150. In an example embodiment, a resistor R2 may be connected between the gate of the FET 130 and the first lead 161. The body 163 of the thermal fuse 160 may be attached to the body surface of the FET 130. In an example embodiment, the body 163 of the thermal fuse 160 may be attached to the body surface of the FET 130 using a heat transfer adhesive material, such as a thermal grease. In addition, a coating material, such as silicon, may be applied to the surface of the body 163 of the thermal fuse 160, thereby protecting the thermal fuse 160 while securely attaching the body 163 of the thermal fuse 160 to the FET 130.

As described above, the body 163 of the thermal fuse 160 may be attached to the FET 130. Thus, the heat generated in the FET 130 may be detected as an elevated temperature at the thermal fuse 160. In an example embodiment, if the temperature of the FET 130 rises to a preset temperature or higher, the thermal fuse 160 may be opened. The thermal fuse 160 may be connected between the FET 130 and the controller 150, and may open at a predetermined temperature that corresponds to a predetermined amount of current flowing in the FET 130. In an example embodiment, when the current flowing in the FET 130 rises to the predetermined or preset current level or higher, the temperature of the FET 130 may increase to or beyond the predetermined temperature at which the thermal fuse 160 opens.

In an example embodiment, in an event of a faulty condition of the FET 130 due to an internal short circuit or the like, a current exceeding a rated current may flow in the FET 130 and heat may be generated in the FET 130. In an example embodiment, the thermal fuse 160 may be opened by the heat generated in the FET 130 from the abnormal current flowing in the FET 130. For example, when a fault is generated due to a short circuit between the gate and the source of the FET 130, the thermal fuse 160 may be opened. In addition, when the source and the drain are short-circuited by a current lower than a rated current of the main fuse 120, the thermal fuse 160 may detect the short circuit current and thus may be opened. The opening temperature of the thermal fuse 160 or a corresponding predetermined rated current may thus be set to be lower than a rated current of the main fuse 120. Therefore, the thermal fuse 160 may detect a micro short circuit that is not interrupted by the main fuse 120, thereby protecting the load control circuit detecting system 100.

The controller 150 may control the FET 130, for example, according to a predetermined control algorithm. The controller 150 may be or include a data processing apparatus embedded in hardware, which has a physically configured circuit to perform a function expressed in codes or instructions included in a program. In an example embodiment, the controller 150 may include a processing apparatus, such as a main controller (MCU), a central processing unit (CPU), a microprocessor, a processor core, a multiprocessor, an application-specific integrated circuit (ASIC), a field programmable gate array (FPGA), and the like.

The controller 150 may control the FET 130 to be turned on/off. In addition, the controller 150 may detect a faulty condition of the FET 130 and may then transmit a fault signal to the system controller 170. For example, the controller 150 may detect a fault of the FET 130 according to the state of the thermal fuse 160 and may notify the system controller 170 of the detected fault. For example, when the temperature of the FET 130 is equal to or greater than a predetermined or preset temperature, the thermal fuse 160 may be opened, and the controller 150 may detect the open state of the thermal fuse 160 to then transmit the fault signal to the system controller 170. In addition, when the current flowing in the FET 130 is equal to or greater than a predetermined rated current that corresponds to an opening temperature of the thermal fuse 160, the thermal fuse 160 may be opened, and the controller 150 may detect the open state of the thermal fuse 160 to then transmit the fault signal to the system controller 170.

The system controller 170 may provide overall control of the load control circuit detecting system 100. The system controller 170 may receive a control signal from the controller 150 and may transmit the control signal to an upper system so as to control the power supply 110. In an example embodiment, the upper system is a system comprehensively controlling and/or managing one of or a plurality of load control circuit detecting systems 100, and may be, for example, a system for managing an energy storage apparatus including a plurality of batteries connected to one another in series/in parallel. In an example embodiment, when the fault signal is received from the controller 150, the system controller 170 may determine that there is a fault generated in the internal system and transmit the fault signal to the upper system to interrupt the power output from the power supply 110. Accordingly, the system controller 170 may protect the load control circuit detecting system 100 and may prevent a secondary accident leading to a fault of the upper system.

A case where the switching element 130 is a relay will now be described with reference to FIG. 3.

Referring to FIG. 3, a relay 230 (as the switching element 130) may include a switch 231 and a coil 232. In the present example embodiment, the switch 231 is positioned on the main current path, for example, with one end of the switch 231 connected to the main fuse 120 and another end of the switch 231 connected to the load 140. The coil 232 may be arranged adjacent to the switch 231 and may be an electromagnet that magnetizes when electricity is turned on and passed therethrough. An input power source 233 that supplies power may be connected to the coil 232. The input power source 233 that operates the relay 230 may supply power having a different level than the power supply 110, and may receive power from the power supply 110. When the power is received from the input power source 233, the coil 232 may be energized to turn into a magnet to pull the switch 231 closed and turn the relay 230 on.

A circuit of the thermal fuse 160 may be connected between the coil 232 and the input power source 233, for example, to control power flow to the coil 232. For example, the first lead 161 of the thermal fuse 160 may be connected to the coil 232, the second lead 162 may be connected to the input power source 233, and the body 163 may be attached to the body surface of the relay 230. In an example embodiment, the body 163 of the thermal fuse 160 may be attached to the body surface of the relay 230 using a heat transfer adhesive material, such as a thermal grease. In addition, a coating material, such as silicon, may be applied to the surface of the body 163 of the thermal fuse 160, thereby protecting the thermal fuse 160 while securely attaching the body 163 of the thermal fuse 160 to the relay 230.

The body 163 of the thermal fuse 160 may be attached to the relay 230. Thus, heat generated in the relay 230 may be detected by the thermal fuse 160. In an example embodiment, if the temperature of the relay 230 rises to a predetermined or preset temperature or higher of the thermal fuse 160, the thermal fuse 160 may be opened.

The controller 150 may be connected to a contact point between the coil 232 of the relay 230 and the first lead 161 of the thermal fuse 160. The controller 150 may detect the open state of the thermal fuse 160 to then transmit the fault signal to the system controller 170.

By way of summation and review, a system capable of detecting a fault due to a micro short circuit that is not detectable using a fuse may help prevent damage.

As described above, embodiments may provide a detecting system for a control circuit of a load, which may help improve safety by detecting an internal fault and interrupting power.

A load control circuit detecting system according to an example embodiment may include a thermal fuse attached to a switching element and detecting a fault of the switching element, and thus a micro short circuit that does not affect a main fuse may be detected to thereby improve safety.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A detecting system for a load control circuit, the detecting system comprising:
    a main fuse connected on a main current path between a power supply and a load that receives power supplied from the power supply;
    a switching element connected on the main current path between the main fuse and the load;
    a thermal fuse attached to a surface of the switching element and configured to open when a temperature of the switching element exceeds a preset temperature;
    a controller configured to control the switching element to be turned on/off, detect an open state of the thermal fuse, and generate a fault signal; and a system controller configured to interrupt the power supplied from the power supply when the fault signal is received from the controller, wherein the switching element is a relay having a switch connected between the main fuse and the load, and a coil connected to the thermal fuse.

2. The detecting system as claimed in claim 1, wherein the thermal fuse is configured to open when an amount of current flowing in the switching element exceeds a predetermined current.

3. The detecting system as claimed in claim 2, wherein the predetermined current is less than a rated current of the main fuse.

4. The detecting system as claimed in claim 1, wherein the thermal fuse is attached to the surface of the switching element by a heat transfer adhesive material.

5. The detecting system as claimed in claim 1, wherein the thermal fuse includes a body that is in contact with the surface of the switching element, a first lead connected to the switching element, and a second lead connected to the controller.

6. A detecting system for a load control circuit, the detecting system comprising:
   a main fuse connected on a main current path between a power supply and a load that receives power supplied from the power supply;
   a switching element connected on the main current path between the main fuse and the load;
   a thermal fuse attached to a surface of the switching element and configured to open when a temperature of the switching element exceeds a preset temperature;
   a controller configured to control the switching element to be turned on/off, detect an open state of the thermal fuse, and generate a fault signal; and
   a system controller configured to interrupt the power supplied from the power supply when the fault signal is received from the controller, wherein the system controller is configured to transmit a signal, indicative of occurrence of a faulty condition, to an upper system when the fault signal is received from the controller.

7. A detecting system for a load control circuit, the detecting system comprising:
   a main fuse connected on a main current path between a power supply and a load that receives power supplied from the power supply;
   a switching element connected on the main current path between the main fuse and the load;
   a thermal fuse attached to a surface of the switching element and configured to open when a temperature of the switching element exceeds a preset temperature;
   a controller configured to control the switching element to be turned on/off, detect an open state of the thermal fuse, and generate a fault signal; and
   a system controller configured to interrupt the power supplied from the power supply when the fault signal is received from the controller, wherein:
   the thermal fuse includes a first lead, a second lead, and a body,
   the switching element is a field effect transistor (FET) having a source connected to the main fuse, a drain connected to the load, and a gate connected to the thermal fuse, and
   the first lead of the thermal fuse is electrically connected to the gate of the FET, and the second lead of the thermal fuse is electrically connected to the controller.

8. The detecting system as claimed in claim 7, wherein a resistor is connected between the gate of the FET and the first lead of the thermal fuse.

9. The detecting system as claimed in claim 7, wherein the thermal fuse is configured to open in response to a short circuit between the source and the gate.

* * * * *